US006965619B2

(12) United States Patent
Bisson et al.

(10) Patent No.: US 6,965,619 B2
(45) Date of Patent: Nov. 15, 2005

(54) FLEXIBLE MULTIPLEXER/DEMULTIPLEXER AND METHOD FOR TRANSPORT OF OPTICAL LINE DATA TO A WIDE/METRO AREA LINK

(75) Inventors: Germain Paul Bisson, Stittsville (CA); Stephen Kieran Anthony Adolph, Ottawa (CA); Ronald Arthur Frank, Calgary (CA); Stephen Knobel, Kemptville (CA); Jim Chi-Luen Yau, Kanata (CA); Barry Leo Pelley, Kinburn (CA)

(73) Assignee: Ciena Corporation, Linthicum, MD (US)

( * ) Notice: Subject to any disclaimer, the term of this patent is extended or adjusted under 35 U.S.C. 154(b) by 1017 days.

(21) Appl. No.: 09/728,970

(22) Filed: Dec. 4, 2000

(65) Prior Publication Data

US 2003/0026298 A1 Feb. 6, 2003

(51) Int. Cl.[7] .................................................... H04J 3/22
(52) U.S. Cl. ........................................ 370/543; 370/907
(58) Field of Search ................................ 370/535, 532, 370/537, 538, 540, 543, 366, 541, 539, 907, 916, 395.51, 211

(56) References Cited

U.S. PATENT DOCUMENTS 5,257,261 A 10/1993 Parruck et al.
5,361,255 A 11/1994 Diaz et al.

(Continued)

FOREIGN PATENT DOCUMENTS

EP 0 924 901 6/1999
EP 0 982 969 3/2000
EP 1 089 506 4/2001
WO WO 01 73988 10/2001

OTHER PUBLICATIONS

Yuko Nakano, et al., “Signal Processing for SDH Digital Cross–Connect System,” IEEE International Conference on Communications, vol. 2, pp. 900–904, 1993.

Jones N et al;A Proposed Variable Bandwidth Allocation (VBA) Methodology For Sonet Virtually Concatenated SPEs, Contribution to T1 Standards Project, XX; Jul. 2000, P1–22 US.

*Primary Examiner*—Wellington Chin
*Assistant Examiner*—Brenda Pham
(74) *Attorney, Agent, or Firm*—Michael R. Cammarata

(57) ABSTRACT

A method and apparatus are provided for flexible time-division multiplexing, and demultiplexing, of serial line data, from 1-n client lines, based on the SONET standard (e.g. OC-48 or OC-192) whereby a predetermined and reconfigurable number of STS-1s are allocated to each client. A multiplexer includes 1 to n mappers for mapping the data of 1 to n clients, according to a predetermined bandwidth allocation, to an N×STS-1 SONET payload, each mapper using y STS-1s where y is 0 to N, the y STS-1s being selected on a sequential or non-sequential concatenation basis from the N STS-1s. Each mapper maps the data of one client and each allocated STS-1 is allocated to one client and the total number of STS-1s allocated to the clients is less than or equal to N. An aggregator aggregates the mapped data into a composite STS payload comprising N STS-1s. A bandwidth allocation receiver receives the bandwidth allocation. The bandwidth allocation may be received from a source external to the multiplexer and the source may be a network controller. A demultiplexer includes a deaggregator for deaggregating the STS payload to provide the mapped data for the clients. 1 to n demappers demap the client data according to the predetermined bandwidth allocation. A bandwidth allocation receiver receives the bandwidth allocation.

11 Claims, 10 Drawing Sheets

U.S. PATENT DOCUMENTS

| | | | |
|---|---|---|---|
| 5,416,772 A | | 5/1995 | Helton et al. |
| 5,461,622 A | | 10/1995 | Bleickardt et al. |
| 5,485,298 A | | 1/1996 | Haas |
| 5,537,405 A | | 7/1996 | Yoshifuji |
| 5,568,486 A | | 10/1996 | Huscroft et al. |
| 6,058,119 A | | 5/2000 | Engbersen et al. |
| 6,118,795 A | | 9/2000 | Fukunaga et al. |
| 6,147,968 A | | 11/2000 | De Moer et al. |
| 6,493,847 B1 | * | 12/2002 | Sorgi et al. ................. 714/800 |
| 6,526,069 B1 | | 2/2003 | Wolf et al. |

* cited by examiner

Single STS-1 Mapping

FLEXIBLE MULTIPLEXER/DEMULTIPLEXER AND METHOD FOR TRANSPORT OF OPTICAL LINE DATA TO A WIDE/METRO AREA LINK

FIELD OF THE INVENTION

This invention relates to a method and apparatus for transporting optical line data, such as from a fiber channel (FC) or Gigabit Ethernet (GbE) interface, to a fiber metropolitan or wide area network (MAN/WAN) and, more specifically, to a multiplexer/demultiplexer for flexibly managing bandwidth over such a network.

BACKGROUND OF THE INVENTION

The transport of optical line data from an enterprise server to a remote device such as a storage device (such as to extend the storage area network to enable storage service providers to offer out-sourced storage services to the enterprise) is presently predominantly based on I/O channel protocols such as FC1, GbE and ESCON. However, these protocols were designed for in-building IT server room requirements and are not suitable for metropolitan (wide) area networks which extend over much greater distances. The use of these protocols over such greater distances imposes several challenges on the infrastructure of the metro area network including the need to accommodate Gbps transport rates with no packet loss and very low latency (delay).

At present such metro area networks (e.g. a metro DWDM transport network) are structured so as to assign an entire fiber wavelength to each data link in order to achieve low latency and high bandwidth. Disadvantageously, however, the cost of such networks is high and the number of customers they are able to serve is limited to the number of wavelengths deployed in the network. Other possible available options include the use of IP or ATM packet switching methods but IP switching inherently drops packets in an overload situation and, further, its transport protocols are relatively heavyweight. ATM switching is also of high cost and is not able to scale well in the Gbps data rate range required for storage traffic. Disadvantageously, the head of line blocking which results from the use of packet routers causes jitter at Gbps data rates. Further, if a normally switched SONET network is used it is necessary to include large realignment buffers at each end (to account for a differing delays incurred by different STS-1s due to different flow paths) and such buffers introduce undesirable latency (i.e. large transmission delays).

There is a need, therefore, for means to economically transport optical line data, such as from a fiber channel (FC) or Gigabit Ethernet (GbE) interface, over a metro or wide area link while achieving predictability with respect to the parameters (e.g. latency and bandwidth) of that link.

SUMMARY OF THE INVENTION

A method and apparatus are provided for flexible time-division multiplexing, and demultiplexing, of serial line data, from 1-n client lines, based on the SONET standard (e.g. OC-48 or OC-192).

In accordance with the present invention there is provided a multiplexer for transporting client data from an optical serial link to a clear optical channel of a metro or wide area link comprising N STS-1s. A mapper maps, according to a predetermined bandwidth allocation, the data to an N×STS-1 SONET payload using y STS-1s where y is 0 to N, the y STS-1s being selected on a sequential or non-sequential concatenation basis from the N STS-1s. An aggregator aggregates the mapped data into a composite STS payload comprising N STS-1s. A bandwidth allocation receiver receives the bandwidth allocation. Preferably, n mappers are provided for mapping data of n clients, each mapper mapping the data of one client and each allocated STS-1 being allocated to one client whereby y for each said mapper is 0 to N and the total number of STS-1s allocated to the clients is less than or equal to N. The bandwidth allocation may be received from a source external to the multiplexer and the source may be a network controller.

Also in accordance with the invention there is provided a demultiplexer for demultiplexing data multiplexed by a multiplexer as aforesaid. A deaggregator deaggregates the STS payload to provide the mapped data for the clients. 1 to n demappers demap the client data according to the predetermined bandwidth allocation. A bandwidth allocation receiver receives the bandwidth allocation. Also provided is a multiplexer/demultiplexer comprising a multiplexer and a demultiplexer as aforesaid.

Further in accordance with the invention is a method for multiplexing client data for transport from an optical serial link to a clear optical channel comprising N STS-1s of a metro or wide area link. Data for 1 to n clients is mapped, according to a predetermined bandwidth allocation, to an N×STS-1 SONET payload using the allocated STS-1s for each client whereby the allocated STS-1s are selected on a sequential or non-sequential concatenation basis from the N STS-1s and the total number of STS-1s allocated to the clients is less than or equal to N. The mapped data is aggregated into a composite STS payload of the N STS-1's. The bandwidth allocation is predetermined by any of a user, a network operator, an application and/or network conditions.

BRIEF DESCRIPTION OF THE DRAWINGS

The invention will now be described in detail with reference to the following drawings in which like reference numerals refer to like elements throughout.

DETAILED DESCRIPTION OF THE ILLUSTRATED PREFERRED EMBODIMENT

Figure 1:
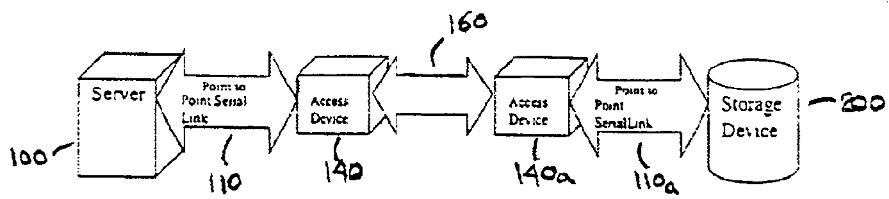
FIG. 1 is a schematic block diagram illustrating an exemplary data transport system, comprising a server, metro/wide area link and remote storage client, in which the multiplexer/demultiplexer of the present invention is used at the access device.

FIG. 1 of the drawings is a schematic block diagram illustrating an exemplary data transport system, from a server (external device) 100 to a storage device 200 (remote device), in which the flexible bandwidth management method and apparatus of the present invention is used at the access devices 140, 140*a*. In this example the server 100 transports data over a high speed optical point-to-point serial link 110 to the access device 140. The access device 140 controls the flow of the data and multiplexes the data on the basis of a flexibly assigned bandwidth allocation for that external device for output onto a metro or wide area fiber transport link 160. At the remote end of the data transport system a similar access device 140*a* receives data from the metro/wide area link 160 and demultiplexes and outputs the data onto another high speed optical point-to-point link 110*a* for transport to the storage device 200. For the reverse data transport direction the access device 140*a* receives the storage device-generated data from the serial link 110*a* and controls the flow of that data and multiplexes and outputs the same onto the metro/wide area link 120. The optical serial links 110, 110*a* could be a Fiber Channel (FC) or Gigabit Ethernet Channel (GbE) and the metro/wide area fiber link 120 could be any of a dedicated fiber, dark fiber or WDM (Wavelength Division Multiplexed) fiber to provide a clear channel.

Figure 2:
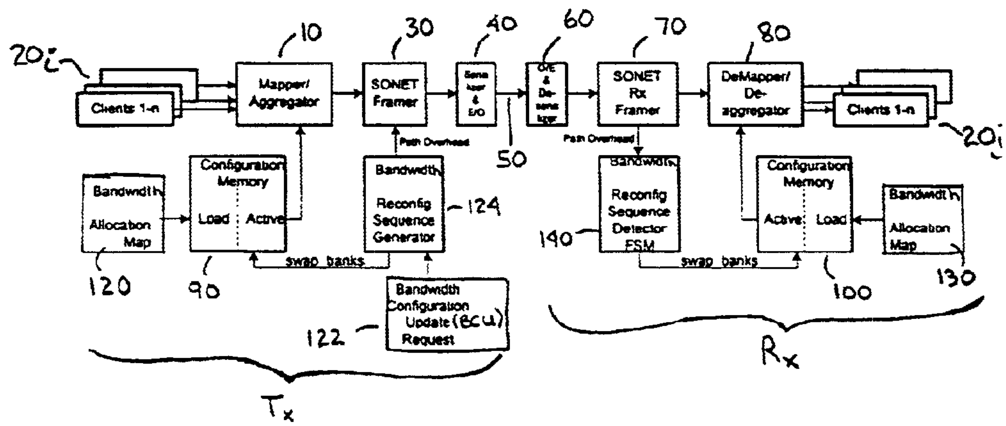
FIG. 2 is a broad functional block diagram of an end-to-end data transport network showing the functional blocks thereof for transporting data from a transmit (Tx) node to a receive (Rx) node thereof and the mapper/aggregator (multiplexer) and demapper/deaggregator (demultiplexer) of the present invention.

FIG. 2 is a broad functional block diagram of an end-to-end data transport network showing the functional blocks thereof for transporting data from a transmit (Tx) node to a receive (Rx) node thereof and the mapper/aggregator 10 (multiplexer) and demapper/deaggregator 80 (demultiplexer) of the present invention. In this figure the network components of transmit (Tx) and receive (Rx) nodes (i.e. a transmitter and receiver, resp.) of the network, servicing clients $\mathbf{20}_{i,j}$, are shown.

At the transmit node the mapper/aggregator 10 performs two related functions which combine to perform flexible time-division multiplexing (based on the SONET standard) to transport the data. First, a mapper (see FIG. 8) maps the client data into a SONET payload as described herein whereby STS-1's are allocated to a particular client $\mathbf{20}_i$ based on a bandwidth allocation configuration provided to it. Since each STS-1 represents a fixed amount of bandwidth the number of STS-1's assigned to a client determines how much bandwidth is allocated to that client. Advantageously, the assignment of bandwidth to each client is flexible in that it can be assigned and changed based on any number of determinants (control parameters) set by a user, a network operator, an application and/or network conditions such as traffic, time of day, etc. Second, an aggregator aggretates (i.e. combines) the client STS-1's into a composite STS payload (being STS-48 in the preferred embodiment for which up to six client ports are selected for aggregation by the aggregator). The aggregate data stream is then fed into a standard SONET transmit framer 30 to insert section/line/path overhead information (data) and create a proper SONET frame. The parallel output from the framer 30 is then serialized and converted to an optical signal by a serializer/E-O converter 40 for transmission over an optical channel 50 of the metro/wide area link 160.

At the receive node the received optical signal is converted back to an electrical signal and to parallel format by an O-E/deserializer converter 60 and then fed into a SONET receive framer 70 where the section/line/path overhead data is extracted and processed. The resulting data stream is passed into a de-aggregator/de-mapper 80 which performs the inverse function of the mapper/aggregator 10. The deaggregator (see FIG. 11) receives the composite STS-48 payload from the SONET framer and, based upon an assigned local bandwidth allocation configuration input thereto, it then separates the composite STS stream into STS-1's according to the client $\mathbf{20}_j$ they are assigned to. The demapper (see FIG. 9) then takes the STS-1's assigned to a particular client $\mathbf{20}_j$ and extracts the client data from them.

The mapper/aggregator 10 and de-aggregator/de-mapper 80 each use a configuration memory 90 and 100, resp., to assign/map each STS-1 to a particular client. For any particular assignment of bandwidth (STS-1s) a client can be assigned any number (n) of STS-1s from n=0 to n=N, where N is the total number of STS-1s of the channel (which, in the case of the preferred embodiment, is 48 since an OC-48 channel is used).

In the preferred embodiment network management software (a network controller) provides the transmit (Tx) and receive (Rx) nodes with a bandwidth allocation map 120, 130 which assigns STS-1's of the SONET link to the particular clients $\mathbf{20}_i$, $\mathbf{20}_j$. This bandwidth mapping information (data) is entered into the load memory bank of each of the configuration memory modules 90, 100. Such use of an external source for the bandwidth allocation is not required by the invention, however, and any suitable alternative source whether internal or external to the multiplexer/demultiplexer of the invention might instead be chosen for a particular embodiment.

In the this embodiment each of the configuration memory modules 90, 100 comprise two memory banks: an active memory bank, which contains the mapping information currently used by the transmitter/receiver, and a load memory bank which loads/holds a new bandwidth configuration. In this embodiment in-service reconfiguration of the bandwidth allocation is achieved. To do so the F2 byte in the SONET path overhead channel is used to carry a flag which is used to synchronize the time at which the active and load memory banks at the receive (Rx) node are swapped (exchanged).

Figure 3:
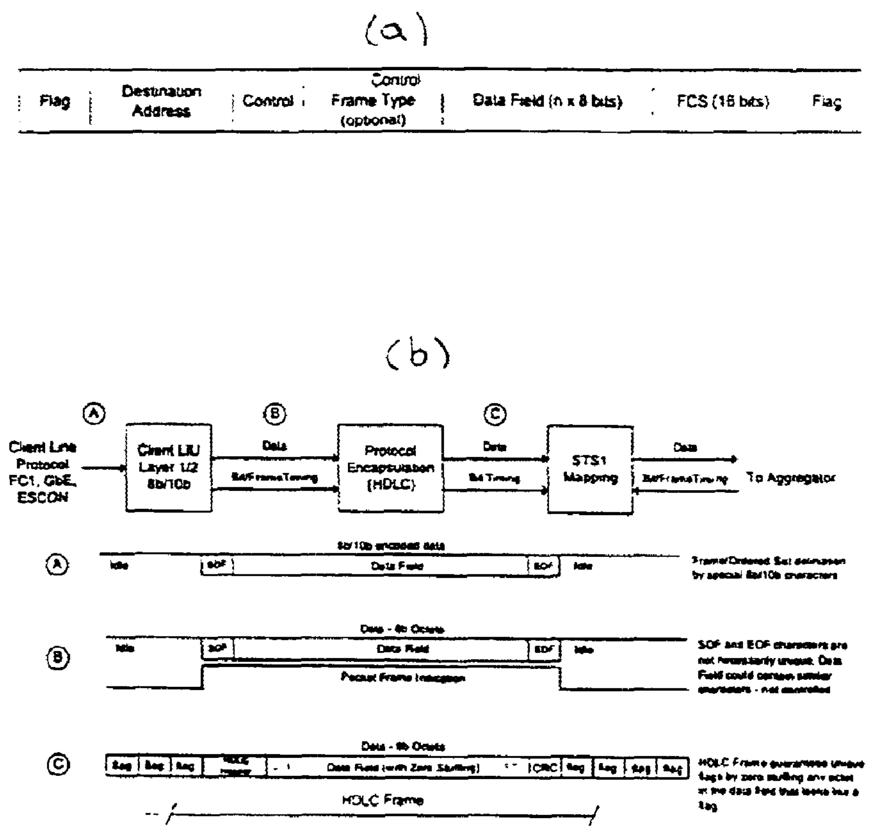
FIG. 3(*b*) illustrates the preparatory handling of the client line protocol data in the preferred embodiment to encapsulate it into an HDLC protocol frame (per FIG. 3(*a*)) for processing by the mapper and aggregator to multiplex the data onto the metro area synchronous optical network (SONET)

FIG. 3(*b*) illustrates the preparatory handling of the client line protocol data (i.e. the fiber channel frames) in the preferred embodiment to encapsulate those data frames into HDLC protocol frames (per FIG. 3(*a*)). The HDLC framing is done by an HDLC encoder utilizing octet stuffing (as necessary) to ensure that the frame content never matches the frame delineation flag in value. The flag sequence of the HDLC frame is a binary sequence used for frame synchronization. The address field is a double octet. The control field is a single octet and identifies the frame type (i.e. client data, primitive sequence, client path messaging or path flow management) and an optional control frame type field identifies the type of control frame (used only when the frame type is path messaging or flow management). The data field's organization is dependent upon the type of frame it is: client data frames have FC or GbE frames embedded in them whereas path messaging or flow management frames have a fixed length and content type according to the type of frame. The frame check sequence (FCS) field (also referred to as the Cyclical Redundancy Check (CRC)) defaults to 16 bits (two octets) and is calculated overall bits of the address, control, control frame type and data fields.

Figure 4:
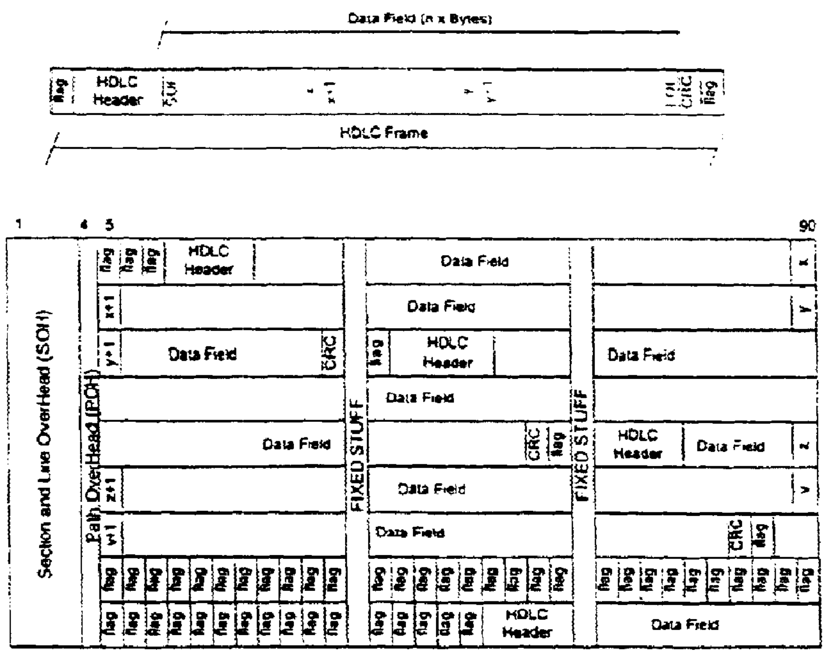
FIG. 4 illustrates, for purposes of instruction only, a mapping of an HDLC frame sequence into a single STS-1.

FIG. 4 is a simple illustration of the manner by which the HDLC frames can be mapped into a SONET STS-1 (this is provided for purposes of instruction but it is unlikely that a client interface would use only one STS-1). As shown, the payload data is mapped into the synchronous payload envelope (SPE) which includes a path overhead column and two "fixed stuff" columns which do not receive payload data. The data frame is mapped across columns from left to right until the end of the SPE is reached and then the data is wrapped around to the next row and the mapping is continued. Although the SONET frame is illustrated in tabular form it is transmitted row by row, from left to right, and this means that the data frames must fill the STS-1 in the same order.

Figure 5:
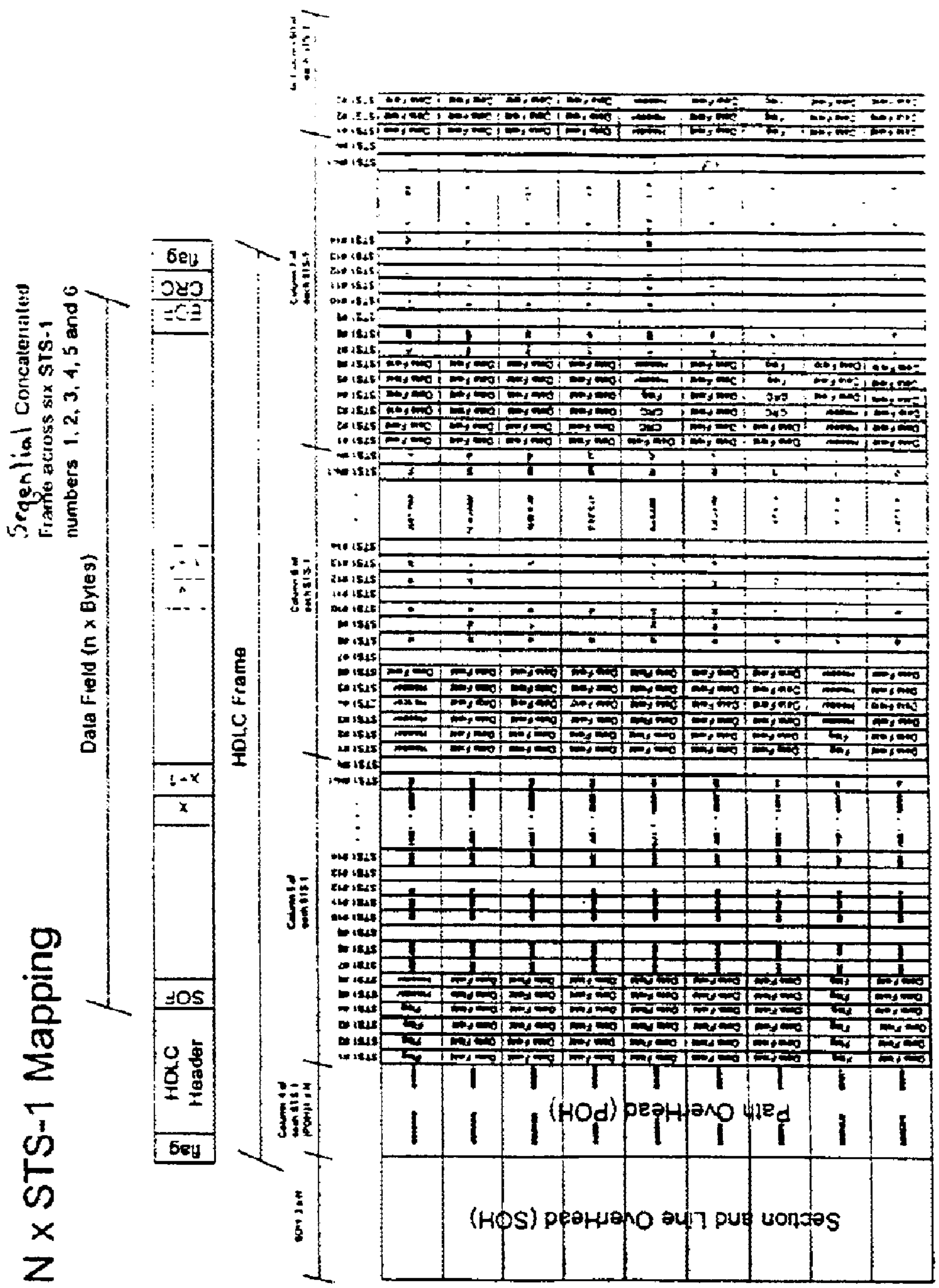
FIG. 5 illustrates a mapping of an HDLC frame sequence into six STS-1s of a SONET frame which is N×STS-1 wide, whereby the mapping is done on a sequentially concatenated frame basis.
Figure 6:
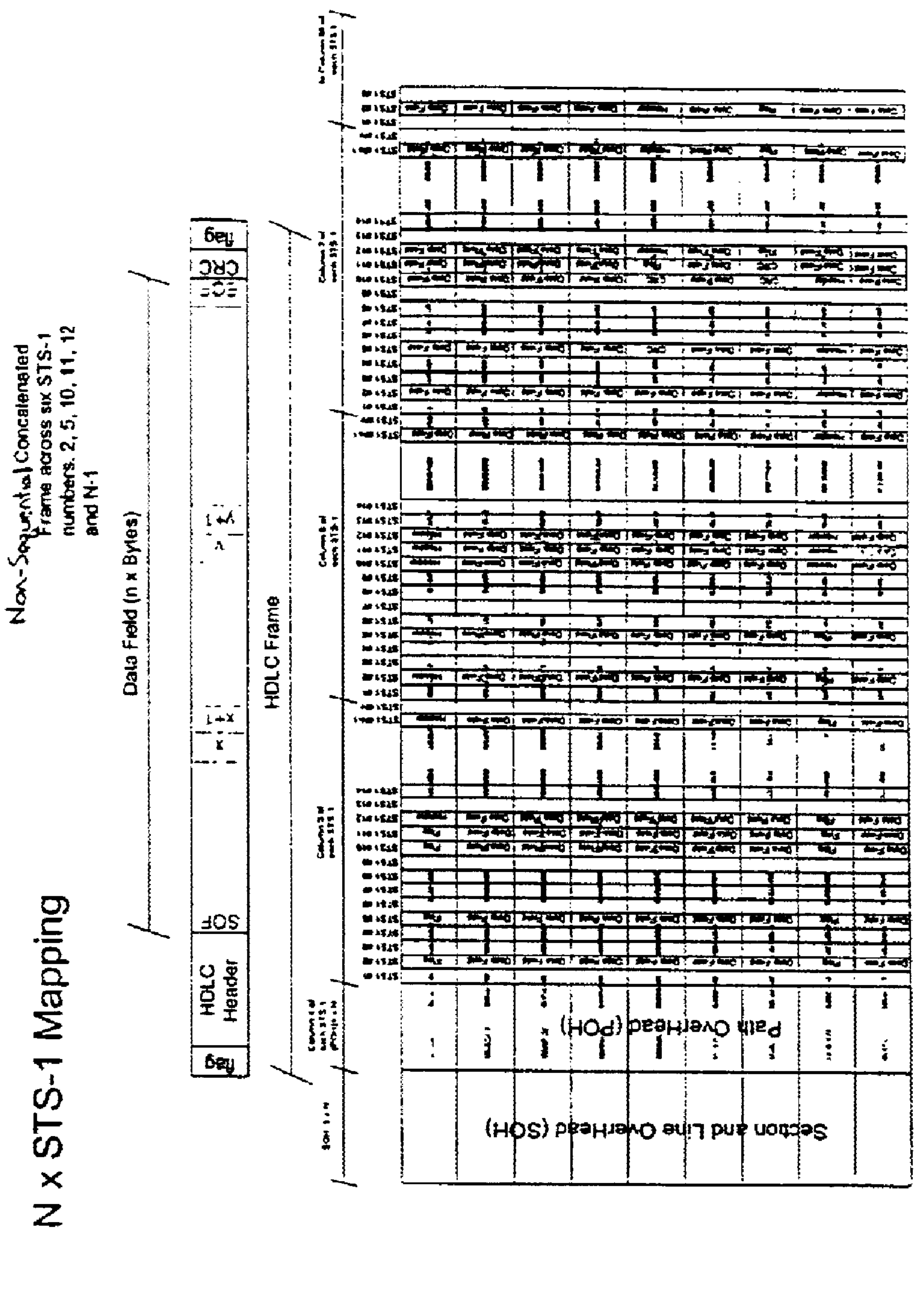
FIG. 6 illustrates a mapping of an HDLC frame sequence into six STS-1s of a SONET frame which is N×STS-1 wide, whereby the mapping is done on a non-sequentially concatenated frame basis using STS-1 numbers 2, 5, 10, 11, 12 and N-1.

FIGS. 5 and 6 illustrate comparative mappings of a client HDLC frame sequence into six STS-1s of a SONET frame which is N×STS-1 wide (note that in the preferred embodiment OC-48 is used so N equals 48), the mapping of FIG. 5 having been done on a sequentially concatenated frame basis and the mapping of FIG. 6 having been done a non-sequentially concatenated frame basis using STS-1 numbers 2, 5, 10, 11, 12 and N-1. Thus, for the sequential concatenation of FIG. 5 the first six STS-1s of the SONET frame (i.e. STS-1 numbers 1–6) are assigned to that client and for the non-sequential concatenation of FIG. 6 STS-1 numbers 2, 5, 10, 11, 12 and N-1 are assigned to that client, and this means that both sequential and non-sequential is used. For the preferred embodiment a non-sequential concatenation will eventually be the utilized format because the network management software will allocate unused STS-1s in order to fully use the channel capacity and the bandwidth allocation is periodically reconfigured as desired.

Figure 7:
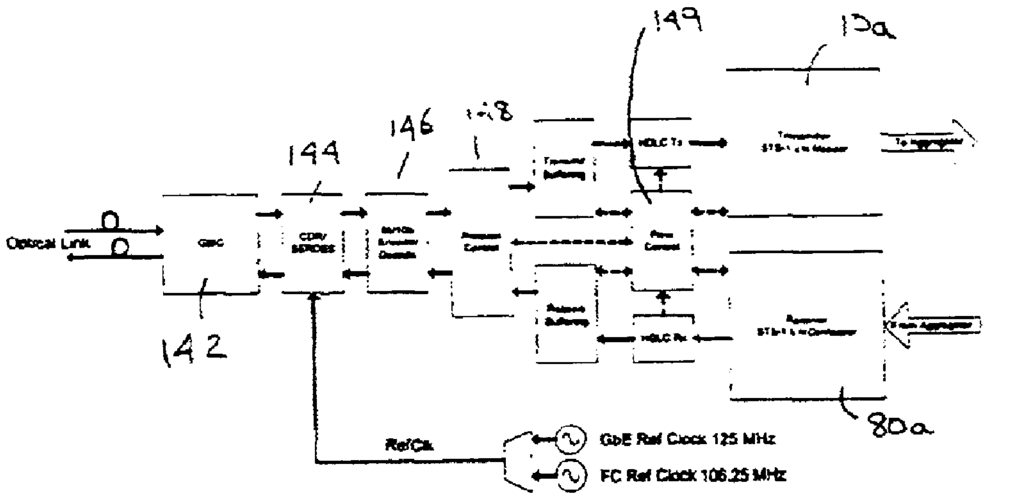
FIG. 7 is a block diagram of a client interface of the preferred embodiment which connects one client to an aggregator (whereby six such client interfaces feed the aggregator in the preferred embodiment)

FIG. 7 is a block diagram of a client interface of the preferred embodiment which connects one client to the aggregator/deaggregator (with six such client interfaces feeding the aggregator/deaggregator in this embodiment but any other suitable number for the chosen SONET channel being possible). Each client interface includes a mapper 10*a* and demapper 80*a* and is programmable to be either a Gigabit Ethernet (1.25 Gb/s) interface or a 1.0625 Gb/s fiber channel interface. A Gigabit Interface Converter (GBIC) 142 converts the optical signal received from a user to an electrical signal and also converts the electrical signal to be transmitted to the user to an optical signal. A Clock and Data Recovery (CDR) component and the Serializer/Deserializer (SERDES) component 144 are implemented in the same piece of hardware. These components recover the received data stream from the client $\mathbf{20}_i$, extract the line speed clock from the stream, deserialize the data stream into a parallel format and divide down the line speed clock to a 1/10th speed clock (as shown). In the reverse direction the components 142, 144 perform the reverse functions. After the data is recovered by the SERDES component if is passed to a 8*b*/10*b* Encoder/Decoder component 146 and then to a Protocol Control component 148 to remove the line coding and prepare the data for transport to the mapper 10*a*. The component 148 also perform client flow control in the preferred embodiment. A flow control component 149 includes buffers that perform rate adaptation and absorb bursts of data from the client. The flow control component 149 regulates the flow of data across the network by monitoring the status of the buffers at each end of the link and provides feedback to the protocol control component 148 when the buffers are filling. This feedback is used to regulate the client transmissions and prevent buffer overflow.

Figure 8:
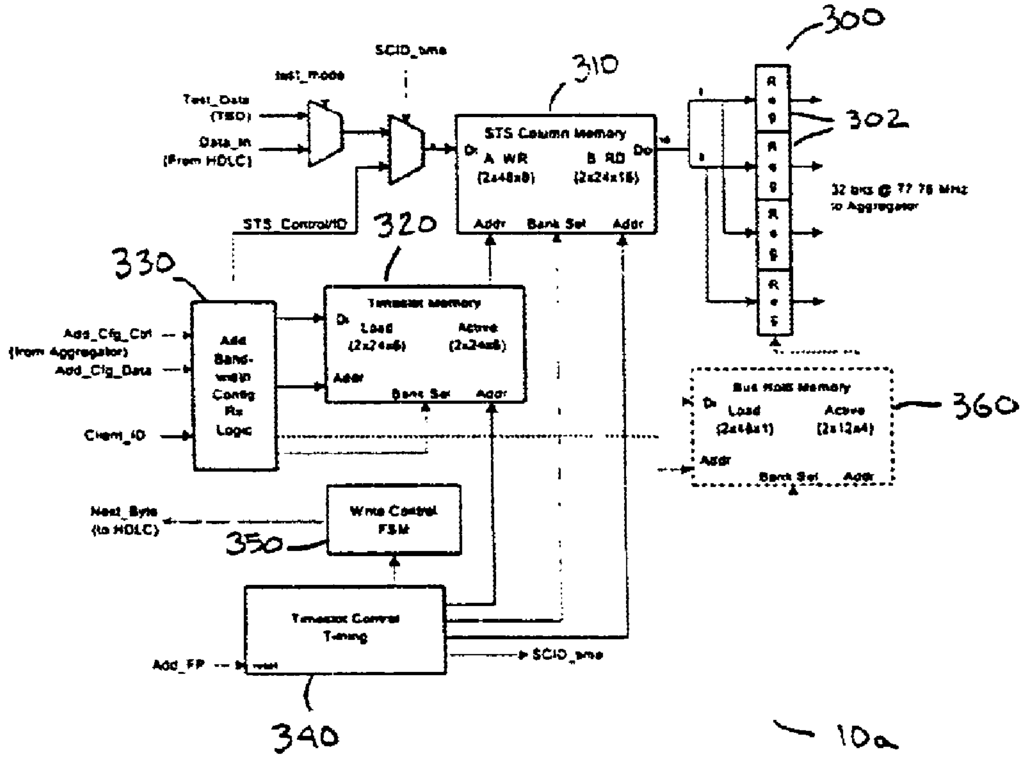
FIG. 8 is a block diagram of a mapper in accordance with the present invention.
Figure 9:
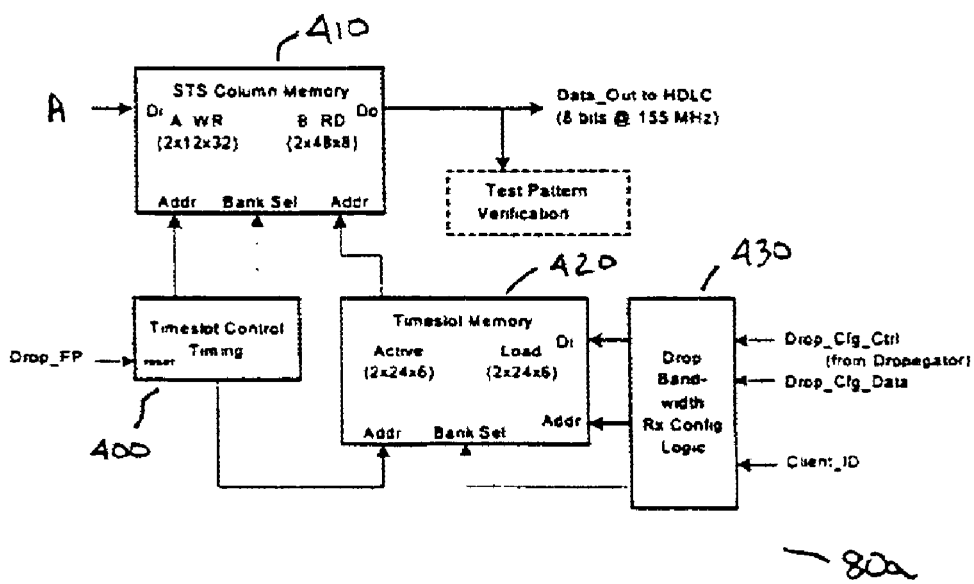
FIG. 9 is a block diagram of a demapper in accordance with the present invention.

The components of the mapper 10*a* of the preferred embodiment are shown in FIG. 8 and the components of the demapper 80*a* of the preferred embodiment are shown in FIG. 9. The mapper 10*a* inserts into the appropriate timeslots of the outgoing TelecomBus 300, for transport to the aggregator, the client data which has been encapsulated in the HDLC frames. An STS column memory 310 (being a dual port RAM) performs the timeslot assignment and its two ports A and B are shown in FIG. 8. Since the SONET frames are byte-interleaved the STS column memory only needs to store two byte-interleaved columns of data and these are referred to herein as timeslot banks 0 and 1. At any given time a column is being assembled in one bank via the A port while the previously assembled column, which resides in the other bank, is read out via the B port. The two banks are toggled/swapped each time a new column is assembled and the old column is read out.

The A port of memory 310 is configured as a write only port of 48 words, 8-bits wide and runs at 155 MHz. HDLC data is stored into memory from this port and the address used to store the byte is a timeslot number derived by a timeslot memory 320. As shown, test data can also be injected into the RAM (i.e. instead of client data) via a test_mode multiplexer. Also as shown, a SCID_time multiplexer is used to inject an STS control/ID into the memory 310 during the SONET path overhead F2 (SCID) timeslot to allow for automatic bandwidth configuration in the demapper 80*a*.

The B port of the memory 310 is configured as a read only port of 24 words, 16-bits wide (i.e. two timeslots per word) and also runs at 155 MHz. The differing port widths necessitate that in the time available (corresponding to one column), the A side can only fill half the available timeslots and this means that the client can use at most 24 timeslots which corresponds to 1.16 Gbps of bandwidth. The B port reads out two timeslots at a time in sequential order. As shown in FIG. 8 four byte-size registers 302 further interleave the data stream to four time slots at a time to form a 32-bit bus 300 which runs at 77.76 MHz.

The timeslot memory 320 determines which timeslots are used to transfer the client data. The memory 320 is also a dual port RAM having two independent banks. One bank is active and controls the timeslot assignment of the A port of memory 310. The other bank is the load bank which contains the new bandwidth (STS) configuration to be loaded and it is swapped with the active bank when the new configuration is to take effect. Port B of the timeslot memory 320 is used to read the active bank. For one column, corresponding to 24 timeslots, the active bank is sequentially stepped through (i.e. addressed) and the output timeslot number is used to specify the timeslot at which the next HDLC byte is to be written to. Port A of the timeslot memory 320 is used to initialize the load bank. An Add Bandwidth Configuration Receive Logic (ABCRxL) component (bandwidth allocation receiver) 330 receives the bandwidth configuration from the aggregator, determines which timeslots have been assigned (using the client_ID) and loads the timeslot values into the timeslot memory 320 via Port A. The ABCRxL also receives the control plane swap message, synchronizes it with the local frame timing and performs a swapping of the banks of the timeslot memory 320.

A timeslot control timing component 340 controls the timing of the mapper 10*a*. It is synchronized by an add frame pulse (Add_FP) and a timing clock keeps track of the byte interleaving of rows and columns of the SONET frame. The timing component 340 also determines the timing for the swapping of the banks of the STS column memory 310 (i.e. for each new column) and when to insert the STS Control/ID byte. A write control FSM (finite state machine) 350 performs handshaking with the HDLC controller and accepts bytes as they can be stored in the STS column memory 310. Accordingly, the FSM determines the rate at which data is mapped.

A bus hold memory 360 may be included to enable the individual register bytes only during valid timeslots that belong to the client. This will cause the bytes of the data bus to change only when they contain relevant data that will be picked up by the aggregator thereby reducing the amount of transitions on the bus and, therefore, the amount of noise on the bus generated by it. The operation of the bus hold memory 360 is similar to that of the timeslot memory 320 and it, too, is loaded by the ABCRxL 330.

The components of the demapper 80*a* are shown in FIG. 9, the function of the demapper being the reverse of that of the mapper. The demapper 80*a* extracts data from the appropriate STS timeslots (i.e. those assigned to the particular client of the demapper) and sends the extracted data to the remaining components of the client interface in the transmit path to de-encapsulate the client data. A timing control component 400 keeps track of the timeslot intervals received on the TelecomBus (shown at A but not illustrated in FIG. 9). An STS column memory 410 extracts the client data stream from the TelecomBus timeslots.

As for the mapper STS column memory 310 the memory 410 of the demapper stores two byte-interleaved columns of data and these are referred to as timeslot banks 0 and 1. At any particular time, a column of timeslots is written into one bank via the A port while the previously written column, which resides in the other bank, is having data extracted from the relevant timeslots via the B port. The banks are toggled/swapped each time a new column is written and an old column is extracted.

The A port of memory 410 is configured as a write only port that is 12 words, 32-bits wide (i.e. four timeslots per word) and runs at 78 MHz. Data is written into the A port in a sequential manner based on timeslot intervals. The B port of the memory 410 is configured as a read only port of 48 words, 8-bits wide and runs at 155 MHz. The address used to read the output data byte is the timeslot number derived from a timeslot memory 420.

The timeslot memory 420 specifies the timeslots from which to extract the client data. It too is a dual port RAM having two independent banks, one bank being active and controlling the timeslot extraction of the port B data of memory 410 and the other bank being a load bank containing the new bandwidth configuration to be loaded. As for the corresponding timeslot memory of the mapper the load bank of timeslot memory 420 is swapped with the active bank when the new configuration is to take effect. Port A of the timeslot memory 420 is used to read the active bank. For one column time (24 timeslots) the active bank is sequentially stepped through (i.e. addressed) and the output timeslot number is used to specify the timeslot containing the next data byte to be output from the STS column memory 410. Port B of the timeslot memory 420 is used to initialize the load bank. A Drop Bandwidth Configuration Receive Logic (DBRxL) component 430 receives the bandwidth configuration from the deaggregator, determines which timeslots have been assigned to it (using the Client_ID) and loads the timeslot values into the timeslot memory 420 via port B. The DBRxL component 430 also receives the control plane swap message, synchronizes it with the local frame timing and performs a swapping of the banks of the timeslot memory 420. A read control FSM (not shown) performs handshaking with the HDLC controller to indicate when the 8-bit output bus contains valid data.

Figure 10:
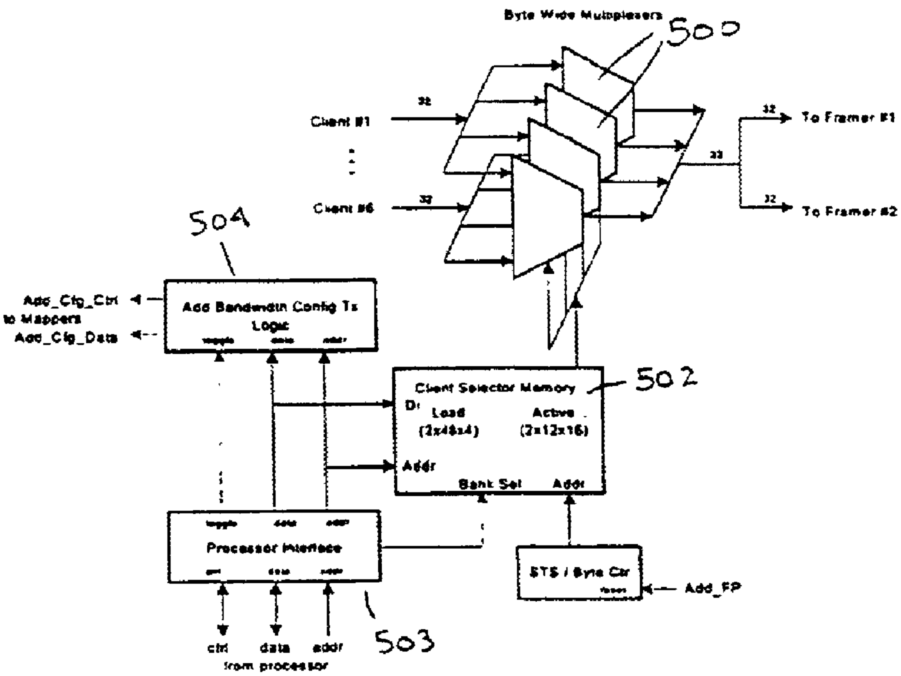
FIG. 10 is a block diagram of an aggregator in accordance with the present invention; and, FIG. 11 is a block diagram of a deaggregator in accordance with the present invention.
Figure 11:
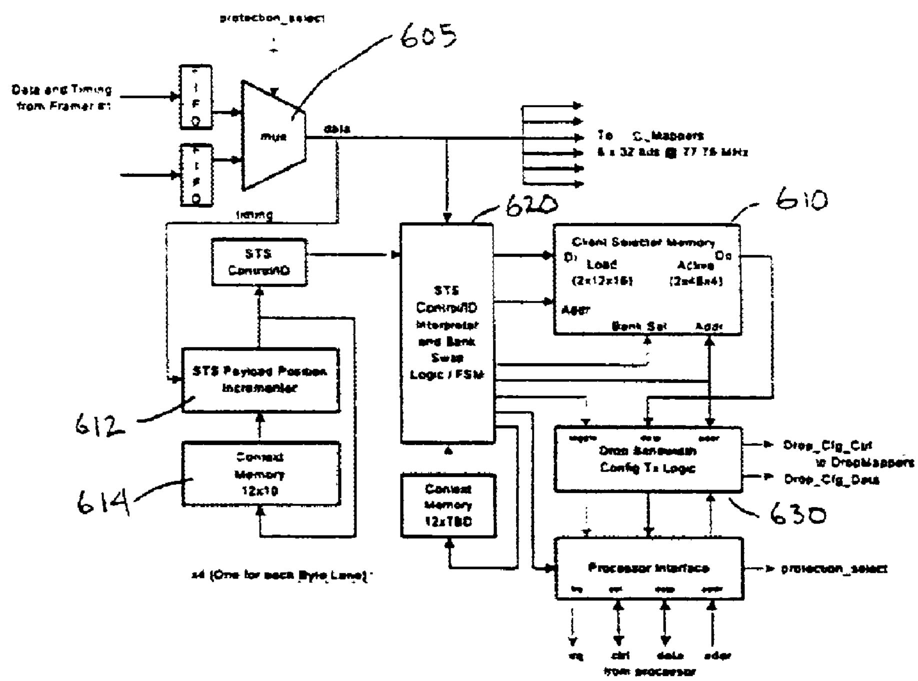

FIG. 10 shows the components of the aggregator of the preferred embodiment and FIG. 11 shows the components of the deaggregator of the preferred embodiment. As shown in FIG. 10 the aggregator accepts six TelecomBuses, one from each of six client interfaces, and it aggregates (i.e. combines) the data of each onto a single TelecomBus. In the aggregator four byte-wide multiplexer units 500 can independently select from amongst the outputs of six mappers 10*a*. If STS-1s have not been assigned to a client the mapper outputs can be forced to zero. A client selector memory 502, which is a dual port RAM having two independent banks, controls the selection of client data lines by the multiplexer units 500. One bank of memory 502 is active and controls the selection of the client data lines and the other bank is a load bank which contains a new bandwidth allocation configuration to be loaded and is swapped with the active bank when the new configuration is to take effect.

Port A of the client selector memory 502 is used to initialize the load bank and the load bank is loaded from a processor interface (bandwidth allocation receiver) 503. This port has 48 4-bit entries, one entry (representing a client number from 1–6 and a valid bit) for each of the 48 STS timeslots. The processor interface 503 also provides the control logic necessary to perform bank swapping of the client selector memory 502 to put a new bandwidth allocation configuration into effect.

Port B of the client selector memory 502 is used to read the active bank. Since the client data path is 32 bits (i.e. 4 timeslots wide) the four selector values are read out at a time, one each timeslot. For one column time (12 timeslot intervals) the active bank is sequentially stepped through (i.e. addressed) and the four client numbers output are used to control the selection of the multiplexers. An Add Bandwidth Configuration Transmit Logic (ABTxL) component 504 broadcasts the load configuration (timeslot/client mapping) from the master image in the load bank of the client selector memory 502 to all the client mappers 10*a*. It also transmits the swap command to swap the active and load planes to bring the new bandwidth allocation configuration into the active plane.

The deaggregator of FIG. 11 performs several functions. It resynchronizes data (TelecomBus streams) input from each of two framers 70 and selects one of the two data streams for processing by six demappers 80*a*. It also extracts and interprets the STS Control/ID field and updates a client selector memory 610 for automatic transmit-side bandwidth reallocation and broadcast of a new bandwidth allocation with swap timing to the demappers 80*a*.

As shown in FIG. 11 two TelecomBus streams from two framers 70 are each input to a small receive FIFO and are resynchronized to the transmit-side clock. A multiplexer 605 protection selects one of them and the selected stream is then fanned out to the demappers 80*a*. Each byte lane of the TelecomBus has its own STS payload position logic (shown in FIG. 11) used to keep track of the position of the individual STS-1 payloads within the TelecomBus. The reason for this is to enable identification of the STS Control/ID field in the F2 path overhead byte in the incoming stream which flags that a new bandwidth allocation configuration has taken effect. The STS payload position logic includes an incrementer 612 and a context memory 614. The context memory 614 stores the current byte count for each of the 12 timeslot intervals and the incrementer 612 updates the byte count of the current timeslot interval. A comparator identifies when the current byte position is the STS Control/ID field. When a particular timeslot has been identified as a STS Control/ID field a STS Control/ID interpreter and Bank Swap Logic (SCIBSL) finite state machine 620 extracts the field from the TelecomBus data stream. Once a valid change pattern sequence has been detected the new client_ID is written into the client selector memory 610. The client selector memory 610 contains the master table of STS-1-to-client mapping which is automatically maintained by the receive side mapper/aggregator components. The SCIBSL finite state machine 620 updates the client selector memory 610 via the A port of the memory. The B port of the client selector memory 610 is used by a Drop Bandwidth Configuration Transmit Logic (DBCTxL) component 630 to broadcast the change to the client demappers 80*a* and a toggle command is issued to instruct the demappers to use the new bandwidth allocation table.

The control and set-up of the bandwidth reconfiguration is done in software and the actual swapping is triggered by software but controlled by hardware to transmit the switch request in the F2 byte of the SONET path overhead.

Advantageously, the granularity of the bandwidth allocation method provided by the invention improves with increasing line rate. In addition, the data flows from each client interface are independent of the activity on the other ports and, therefore, interdependencies between the client interfaces are avoided.

Although the exemplary transport network application discussed herein with reference to the preferred embodiment is a storage data application the multiplexer/demultiplexer of the present invention may be used for non-storage data flows such as the Internet.

The individual electronic and processing functions utilised in the foregoing described preferred embodiment are, individually, well understood by those skilled in the art. It is to be understood by the reader that a variety of other implementations may be devised by skilled persons for substitution. Persons skilled in the field of communication design will be readily able to apply the present invention to an appropriate implementation method for a given application.

Consequently, it is to be understood that the particular embodiment shown and described herein by way of illustration is not intended to limit the scope of the invention claimed by the inventors which is defined by the appended claims.

What is claimed is:

1. A multiplexer for transporting client data from an optical serial link to a clear optical channel of a metro or wide area link comprising N STS-1s, said multiplexer comprising:

(a) a mapper configured for mapping said client data to an N×STS-1 SONET payload using y STS-1s where y is 0 to N and said y STS-1s are selected on a sequential or non-sequential concatenation basis from said N STS-1s, said mapping being according to a predetermined bandwidth allocation;

(b) an aggregator configured for aggregating said mapped data into a composite STS payload comprising N STS-1s; and, (c) a bandwidth allocation receiver configured for receiving said predetermined bandwidth allocation.

2. A multiplexer according to claim 1 further comprising, n mappers for mapping data of n clients, each of said n mappers mapping the data of one said n clients and each allocated STS-1 being allocated to one of said n clients whereby y for each of said n mappers is 0 to N and the total number of STS-1s allocated to said clients is less than or equal to N.

3. A multiplexer according to claim 2 wherein said bandwidth allocation is received from a source external thereto.

4. A multiplexer according to claim 3 wherein said source is a network controller.

5. A multiplexer according to claim 4 wherein n=6 and N=48.

6. A demultiplexer for demultiplexing data multiplexed by a multiplexer according to claim 1, said demultiplexer comprising:

(a) a deaggregator configured for deaggregating said composite STS payload and providing said mapped data for a client;

(b) a demapper configured for demapping said client data according to said predetermined bandwidth allocation; and, (c) a bandwidth allocation receiver configured for receiving said predetermined bandwidth allocation.

7. A demultiplexer for demultiplexing data multiplexed by a multiplexer according to claim 2, said demultiplexer comprising:

(a) a deaggregator configured for deaggregating said STS payload and providing said mapped data for said n clients;

(b) n demappers configured for demapping said mapped data of said n clients according to said predetermined bandwidth allocation; and, (c) a bandwidth allocation receiver configured for receiving said predetermined bandwidth allocations.

8. A multiplexer/demultiplexer comprising a multiplexer according to claim 2 and a demultiplexer according to claim 7.

9. A method for multiplexing client data for transport from an optical serial link to a clear optical channel comprising N STS-1s of a metro or wide area link, comprising:

(a) mapping said data to an N×STS-1 SONET payload using y STS-1s where y is 0 to N and said y STS-1s are selected on a sequential or non-sequential concatenation basis from said N STS-1s, said mapping being according to a predetermined bandwidth allocation; and, (b) aggregating said mapped data into a composite STS payload of said N STS-1's.

10. A method according to claim 9 whereby data of n clients is mapped according to a predetermined bandwidth allocation, each allocated STS-1 being allocated to one client, y for each n clients being 0 to N and the total number of STS-1s allocated to said n clients being less than or equal to N.

11. A method according to claim 10 whereby said predetermined bandwidth allocation is predetermined by any of a user, a network operator, an application and/or network conditions.

* * * * *